(12) United States Patent
Shen et al.

(10) Patent No.: US 10,966,245 B2
(45) Date of Patent: Mar. 30, 2021

(54) CHANNEL CONFIGURATION METHOD AND BASE STATION

(71) Applicant: HUAWEI TECHNOLOGIES CO., LTD., Guangdong (CN)

(72) Inventors: Haihua Shen, Shanghai (CN); Wenliang Liang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/452,509

(22) Filed: Jun. 25, 2019

(65) Prior Publication Data

US 2019/0320464 A1 Oct. 17, 2019

Related U.S. Application Data

(63) Continuation of application No. PCT/CN2017/115965, filed on Dec. 13, 2017.

(30) Foreign Application Priority Data

Dec. 26, 2016 (CN) .......................... 201611220990.5

(51) Int. Cl.
   *H04W 74/08* (2009.01)
   *H04W 72/04* (2009.01)
   *H04W 88/08* (2009.01)

(52) U.S. Cl.
   CPC ... *H04W 74/0808* (2013.01); *H04W 72/0453* (2013.01); *H04W 74/0833* (2013.01); *H04W 88/085* (2013.01)

(58) Field of Classification Search
   CPC ......... H04W 72/0453; H04W 74/0833; H04W 74/004; H04W 24/02; H04W 88/085; H04W 4/0808
   See application file for complete search history.

(56) References Cited

U.S. PATENT DOCUMENTS 5,940,380 A * 8/1999 Poon ................. H04W 36/0094
                                                    370/330
6,181,941 B1    1/2001 McCarthy
(Continued)

FOREIGN PATENT DOCUMENTS

CN    101166048 A    4/2008
CN    101610527 A    12/2009
(Continued)

*Primary Examiner* — Syed Ali
(74) *Attorney, Agent, or Firm* — Womble Bond Dickinson (US) LLP

(57) ABSTRACT

Embodiments of this application provide a channel configuration method. The method includes: determining, by a base station, a quantity of system flows based on a random access channel detection result; configuring, by the base station, an uplink channel and a downlink channel based on the quantity of system flows, where the uplink channel is a radio frequency channel used for uplink transmission, and the downlink channel is a radio frequency channel used for downlink transmission; and transmitting, by the base station, data based on the configured uplink channel and the configured downlink channel. Therefore, while system transmission performance is ensured, a communication requirement can be flexibly met, and system processing resources and transmission resources can be saved.

9 Claims, 12 Drawing Sheets

(56) References Cited

U.S. PATENT DOCUMENTS

| | | | |
|---|---|---|---|
| 2010/0069037 A1* | 3/2010 | Fischer | H04W 74/0833 455/410 |
| 2010/0172299 A1* | 7/2010 | Fischer | H04W 74/002 370/328 |
| 2010/0296459 A1 | 11/2010 | Miki et al. | |
| 2010/0323736 A1* | 12/2010 | Fischer | H04W 74/0866 455/509 |
| 2011/0281615 A1 | 11/2011 | Yamada et al. | |
| 2012/0188958 A1* | 7/2012 | Suzuki | H04W 72/0413 370/329 |
| 2013/0148613 A1* | 6/2013 | Han | H04L 27/2636 370/329 |
| 2013/0322280 A1* | 12/2013 | Pi | H04W 56/0005 370/252 |
| 2014/0219162 A1 | 8/2014 | Eyuboglu et al. | |
| 2014/0328309 A1* | 11/2014 | Comstock | H04W 72/082 370/329 |
| 2015/0063480 A1 | 3/2015 | Marsch et al. | |
| 2016/0057784 A1* | 2/2016 | You | H04W 74/002 370/329 |
| 2016/0112934 A1 | 4/2016 | Yamada et al. | |
| 2016/0270080 A1 | 9/2016 | Zeng et al. | |
| 2016/0323906 A1 | 11/2016 | Wang et al. | |
| 2017/0347350 A1* | 11/2017 | Takeda | H04W 72/12 |
| 2020/0178333 A1* | 6/2020 | Liu | H04W 74/006 |
| 2020/0229180 A1* | 7/2020 | Liu | H04L 5/0051 |

FOREIGN PATENT DOCUMENTS

| | | |
|---|---|---|
| CN | 102293032 A | 12/2011 |
| CN | 102340854 A | 2/2012 |
| CN | 102640556 A | 8/2012 |
| CN | 102833863 A | 12/2012 |
| CN | 103826313 A | 5/2014 |
| CN | 104205658 A | 12/2014 |
| WO | 2016145371 A2 | 9/2016 |

\* cited by examiner

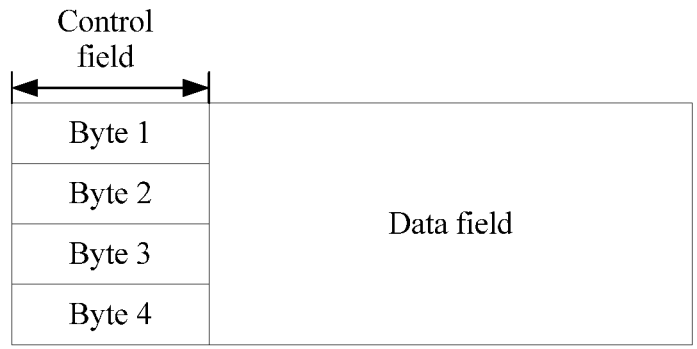
FIG. 9
| Length | Type | Receiving channel quantity | Sending channel quantity | Receiving channel indication | Sending channel indication | Others |
|---|---|---|---|---|---|---|
FIG. 10
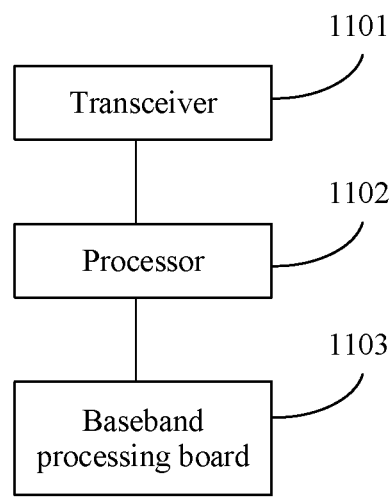
FIG. 11

CHANNEL CONFIGURATION METHOD AND BASE STATION

CROSS-REFERENCE TO RELATED APPLICATIONS

This application is a continuation of International Application No. PCT/CN2017/115965, filed on Dec. 13, 2017, which claims priority to Chinese Patent Application No. 201611220990.5, filed on Dec. 26, 2016. The disclosures of the aforementioned applications are hereby incorporated by reference in their entireties.

TECHNICAL FIELD

Embodiments of this application relate to the communications field, and more specifically, to a channel configuration method and a base station.

BACKGROUND

In a communications system, a massive multiple-input multiple-output (Massive MIMO) technology can support more independent spatial data flows by increasing a quantity of antennas on the basis of existing multiple antennas. This improves spectrum efficiency of a multiuser system by a plurality of times, and plays an important supporting role in meeting requirements on a system capability and a data transmission rate of the future communications system.

However, if N channels are configured on a base station side, a radio frequency part receives or sends data that is on the N channels, and a baseband part processes the data that is on the N channels. A quantity of channels cannot be reduced in real time based on an actual need. Even if some channels are damaged or cannot be used, the radio frequency part and the baseband part still receive or send and process the data that is on the N channels before the channels are replaced. Consequently, a system on the base station side is not flexible enough, and transmission resources cannot be properly allocated while ensuring system performance.

SUMMARY

Embodiments of this application provide a channel configuration method and a base station. In the method provided in the embodiments of this application, a relatively small quantity of radio frequency channels may be configured when a relatively small quantity of users or no user performs access, so that data transmission and calculation can be reduced on a base station side.

According to one aspect, an embodiment of this application provides a channel configuration method. The method includes: determining, by a base station, a quantity of system flows based on a random access channel (RACH) detection result; configuring, by the base station, an uplink channel and a downlink channel based on the quantity of system flows, where the uplink channel is a radio frequency channel used for uplink transmission, and the downlink channel is a radio frequency channel used for downlink transmission; and transmitting, by the base station, data based on the configured uplink channel and the configured downlink channel. Therefore, while system transmission performance is ensured, a communication requirement can be flexibly met, and system processing resources and transmission resources can be saved.

In one embodiment, the configuring, by the base station, an uplink channel and a downlink channel based on the quantity of system flows includes: determining a quantity of uplink channels and a quantity of downlink channels based on the quantity of system flows; and determining the uplink channel based on the quantity of uplink channels, and determining the downlink channel based on the quantity of downlink channels. The base station may determine the quantity of uplink channels and the quantity of downlink channels through table lookup or calculation. Therefore, channels can be quickly configured.

In one embodiment, the base station includes a baseband part and a radio frequency part; and the configuring, by the base station, an uplink channel and a downlink channel based on the quantity of system flows includes: determining, by the baseband part, the uplink channel and the downlink channel based on the quantity of system flows; notifying, by the baseband part, the radio frequency part of information about the uplink channel and the downlink channel; and determining, by the radio frequency part, the uplink channel and the downlink channel based on the information about the uplink channel and the downlink channel.

In one embodiment, the base station includes a baseband part, a remote entity, and a radio frequency part; and the configuring, by the base station, an uplink channel and a downlink channel based on the quantity of system flows includes: determining, by the remote entity, the uplink channel and the downlink channel based on the quantity of system flows; notifying, by the remote entity, the baseband part and the radio frequency part of information about the uplink channel and the downlink channel; and determining, by the radio frequency part, the uplink channel and the downlink channel based on the information about the uplink channel and the downlink channel.

In one embodiment, the base station periodically corrects all radio frequency channels.

In one embodiment, the base station reconfigures the uplink channel and the downlink channel when a preset condition is met.

One embodiment, in a multicarrier communication scenario, provides a channel configuration method. The method includes: determining, by a base station, a quantity of system flows of each of a plurality of carriers based on a RACH detection result of each of the plurality of carriers; configuring, by the base station, an uplink channel and a downlink channel of each of the plurality of carriers based on the quantity of system flows of each of the plurality of carriers; and transmitting, by the base station, data based on the uplink channel and the downlink channel of each of the plurality of carriers.

One embodiment of this application provides a base station. The base station includes a processor and a transceiver. The processor is configured to: determine a quantity of system flows based on a RACH detection result, and configure an uplink channel and a downlink channel based on the quantity of system flows, where the uplink channel is a radio frequency channel used for uplink transmission, and the downlink channel is a radio frequency channel used for downlink transmission. The transceiver is configured to transmit data based on the configured uplink channel and the configured downlink channel. Therefore, while system transmission performance is ensured, a communication requirement can be flexibly met, and system processing resources and transmission resources can be saved.

In one embodiment, the configuring an uplink channel and a downlink channel based on the quantity of system flows includes: determining a quantity of uplink channels and a quantity of downlink channels based on the quantity of system flows; and determining the uplink channel based on the quantity of uplink channels, and determining the downlink channel based on the quantity of downlink channels. The base station may determine the quantity of uplink channels and the quantity of downlink channels through table lookup or calculation. Therefore, channels can be quickly configured.

In one embodiment, the processor includes a baseband processing module and a radio frequency processing module; and that the processor is adapted to configure the uplink channel and the downlink channel based on the quantity of system flows includes: the baseband processing module is configured to: determine the uplink channel and the downlink channel based on the quantity of system flows, and notify the radio frequency processing module of information about the uplink channel and the downlink channel; and the radio frequency processing module is configured to determine the uplink channel and the downlink channel based on the information about the uplink channel and the downlink channel.

In one embodiment, the processor includes a baseband processing module, a remote processing module, and a radio frequency processing module: the remote processing module determines the uplink channel and the downlink channel based on the quantity of system flows, and notifies the baseband processing module and the radio frequency processing module of information about the uplink channel and the downlink channel; and the radio frequency processing module determines the uplink channel and the downlink channel based on the information about the uplink channel and the downlink channel.

In some embodiments, the base station may also be configured to implement the channel configuration method in the multicarrier communication scenario.

One embodiment of this application provides a computer storage medium, configured to store a computer software instruction used by the foregoing base station or a related processor, and the computer software instruction includes a program designed to perform the foregoing method.

In some embodiments of this application, a relatively small quantity of radio frequency channels are configured when a relatively small quantity of users or no user performs access, so that data transmission and calculation can be reduced on a base station side (for example, between the baseband part and the radio frequency part, or between the radio frequency part and an air interface).

BRIEF DESCRIPTION OF DRAWINGS

The following briefly introduces the accompanying drawings required for describing the embodiments. The accompanying drawings in the following description show some embodiments of this application, and a person of ordinary skill in the art may still derive other drawings from these accompanying drawings without creative efforts.

FIG. 9 is a schematic diagram of a frame structure of a basic frame;

FIG. 10 is a schematic diagram of a message used to carry information about an uplink channel and a downlink channel;

FIG. 11 is a schematic diagram of a possible structure of a baseband part according to an embodiment of this application;

DESCRIPTION OF EMBODIMENTS

The following describes embodiments of this application with reference to the accompanying drawings in the embodiments of this application. The described embodiments are some rather than all of the embodiments of this application. All other embodiments obtained by a person of ordinary skill in the art based on the embodiments of this application without creative efforts shall fall within the protection scope of this application.

It should be understood that a form of a base station in the embodiments of this application is not unique provided that the base station has a baseband processing function, a radio frequency processing function, and a function of performing transmission between a baseband and a radio frequency. For example, in the base station, a baseband processing entity with the baseband processing function may be a baseband unit (BBU), and a radio frequency processing entity with the radio frequency processing function may be a radio remote unit (RRU).

Figure 1:
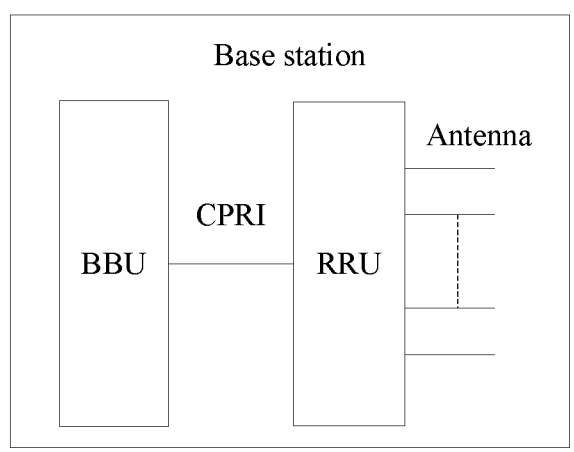
FIG. 1 is a schematic structural diagram of a base station.

FIG. 1 is a schematic structural diagram of a base station. As shown in FIG. 1, the base station mainly includes a BBU, an RRU, and an antenna. Data is transmitted between the BBU and the RRU through a common public radio interface (CPRI) or through a network, and the RRU is connected to the antenna by using a coaxial cable, a power splitter or a coupler, and the like. Data may be transmitted between one BBU and one or more RRUs. In FIG. 1, for example, data is transmitted between one BBU and one RRU. The BBU is used for baseband processing. The RRU is used to convert a baseband signal into a radio frequency signal, and transmit the radio frequency signal by using the antenna. Alternatively, the RRU is used to convert a radio frequency signal received by the antenna into a baseband signal, and transmit the baseband signal to the BBU.

However, currently, in a conventional BBU and RRU, fixed receiving and transmitting channels are configured. Therefore, the BBU performs real-time receiving and sending and baseband processing based on a fixed radio frequency channel. The RRU receives and sends or processes radio frequency data in real time based on a fixed radio frequency channel, and transmits the radio frequency data to the antenna through the fixed radio frequency channel. Alternatively, the RRU receives air interface data based on a fixed channel, converts the air interface data into a baseband signal through processing, and transmits the baseband signal to the BBU.

Figure 2:
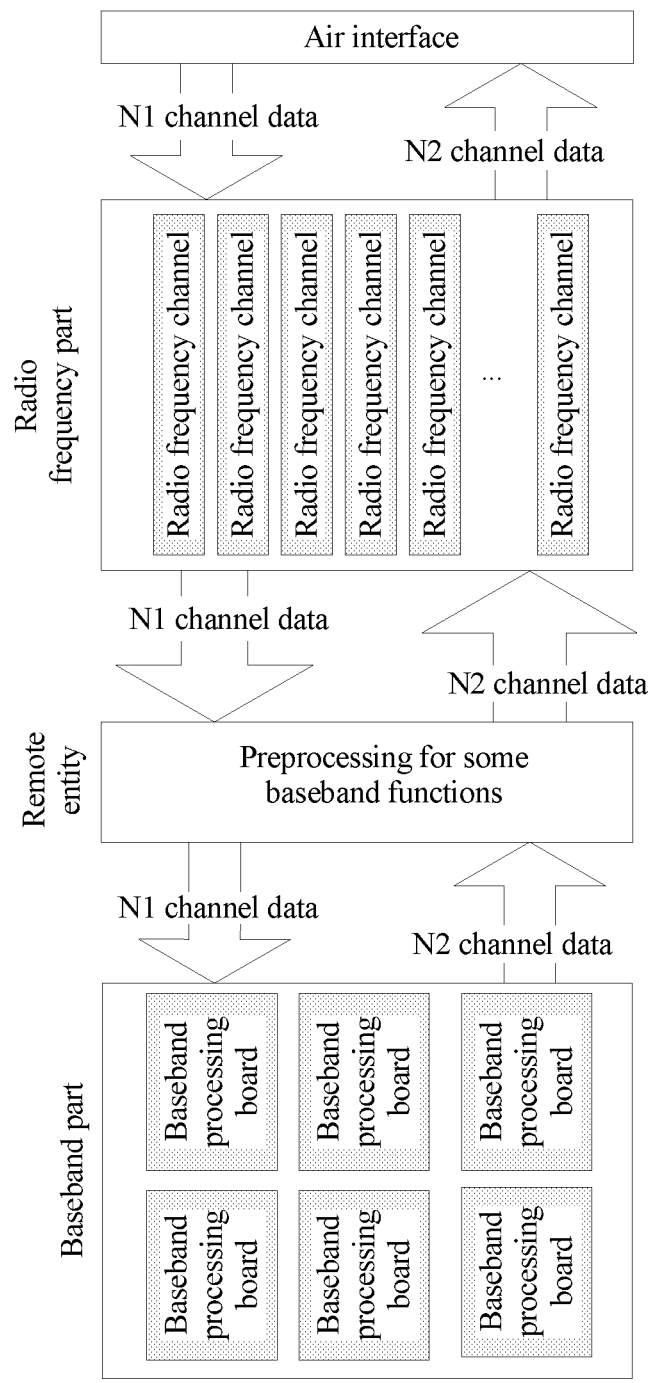
FIG. 2 is a schematic structural diagram of another base station.

FIG. 2 is a schematic structural diagram of another base station. As shown in FIG. 2, the base station includes a baseband part, a remote entity, and a radio frequency part. The baseband part is used for baseband processing, and includes one or more baseband processing boards. The radio frequency part is used for radio frequency processing, and includes one or more radio frequency channels. The remote entity is used to perform preprocessing for some baseband functions. Data is transmitted between the baseband part and the remote entity through a network, and data is transmitted between the remote entity and the radio frequency part through a CPRI or a network. It is assumed that the radio frequency part includes N radio frequency channels, where N1 radio frequency channels are used for uplink transmission (or there are N1 radio frequency channels in uplink), and N2 radio frequency channels are used for downlink transmission (or there are N2 radio frequency channels in downlink). In this case, N1 channel data is transmitted between the radio frequency part and the remote entity, and between the remote entity and the baseband part, and N2 channel data is transmitted between the baseband part and the remote entity, and between the remote entity and the radio frequency part. The N1 channel data is data that can be transmitted by using the determined N1 radio frequency channels, and the N2 channel data is data that can be transmitted by using the determined N2 radio frequency channels. N is not less than N1, N is not less than N2, and N, N1 and N2 are positive integers.

Uplink data transmission and downlink data transmission performed by the base station are described below based on FIG. 2.

In uplink, the radio frequency part receives uplink N1 channel data from an air interface, and the radio frequency part processes the received uplink data to obtain processed N1 channel data, and sends the N1 channel data to the baseband part by using the remote entity. After receiving the N1 channel data, the baseband part performs related baseband processing on the N1 channel data.

In downlink, the baseband part performs baseband processing on to-be-transmitted data to generate N2 channel data, and sends the N2 channel data to the radio frequency part by using the remote entity; and after processing the received N2 channel data, the radio frequency part obtains downlink N2 channel data, and sends the downlink N2 channel data out through the air interface.

Figure 2A:
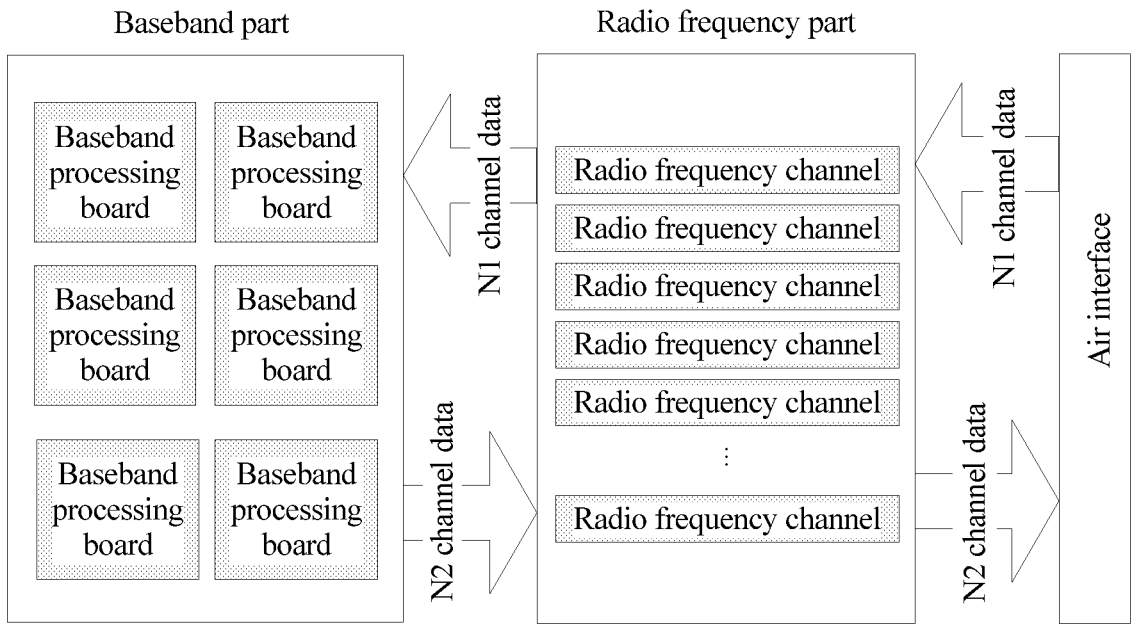
FIG. 2a is a schematic structural diagram of still another base station.

FIG. 2a is a schematic structural diagram of still another base station. As shown in FIG. 2a, the base station includes a baseband part and a radio frequency part, and data is transmitted between the baseband part and the radio frequency part through a network. The base station does not include a remote entity. The baseband part completes a function of the remote entity, or the remote entity is combined (or integrated) into the baseband part. When data is transmitted, through a network, between the BBU and the RRU of the base station shown in FIG. 1, it may be considered as a special example of the base station shown in FIG. 2a. The baseband part and the radio frequency part in FIG. 2a may also implement functions of the baseband part and the radio frequency part shown in FIG. 2. Details are not described herein. The radio frequency part can receive uplink N1 channel data from an air interface, or send downlink N2 channel data through the air interface. The baseband part can receive the N1 channel data sent by the radio frequency part, or send the N2 channel data to the radio frequency part. It should be noted that in FIG. 2 and FIG. 2a, the radio frequency part receives the uplink N1 channel data from the air interface, but it does not mean that the air interface sends only the N1 channel data. The air interface can send any data, but the radio frequency part, only data that can be processed and transmitted on the N1 radio frequency channels.

However, when a large-scale antenna array is used for data transmission on an air interface side, a quantity of user flows is relatively large, a transmission amount is large, and calculation complexity is high. The base stations shown in FIG. 1, FIG. 2, and FIG. 2a perform communication by using a fixed radio frequency channel, so that a communication requirement in such a scenario can be well met. When the quantity of user flows is reduced, if communication is still performed by using the fixed radio frequency channel, system processing resources are wasted, and a communication requirement cannot be flexibly met when a communication scenario changes. Likewise, when no user performs communication, if the base station shown in FIG. 2 still performs communication by using the N1 uplink radio frequency channels and the N2 downlink radio frequency channels, system processing resources are also wasted. Especially when no user performs access in a long period of time, the radio frequency part still performs receiving or sending by using N1 or N2 radio frequency channels, and a quantity of channels used for data transmission is not reduced in real time. Consequently, excessively high transmission power consumption is caused, and unnecessary transmission resources and system processing resources are occupied.

Similarly, in a multicarrier scenario (it is assumed that the base station shown in FIG. 2 supports a bandwidth of 200 M, and includes 10 carriers each with a bandwidth of 20 M), if data is transmitted on each carrier by using the N1 uplink radio frequency channels and the N2 downlink radio frequency channels, a real-time communication requirement cannot be flexibly met either. For example, if quantities of users who perform access on each carrier are different, and data is transmitted on each carrier by using the N1 channels and the N2 channels, when some carriers have no user or have a relatively small quantity of users, an amount of data transmitted between the baseband part and the radio frequency part is increased, and system processing resources are wasted.

When the large-scale antenna array is used, and when some radio frequency channels are abnormal (for example, the radio frequency channel is damaged, and cannot receive or send data normally), if communication is still performed by using the fixed radio frequency channel, the real-time communication requirement cannot be flexibly met either. Data receiving and sending on the abnormal radio frequency channel (which may be referred to as an abnormal channel) is invalid. Therefore, it is unnecessary to receive, send, and process invalid data for a long period of time, which wastes system processing resources. In addition, if data on a common channel (or a channel for transmitting common control information) is transmitted on the abnormal channel, receiving and sending of the common channel is affected. Consequently, a communications system cannot perform effective scheduling control. For example, when a downlink synchronization channel is located on the abnormal channel, a terminal fails to perform downlink synchronization, and cannot perform normal access. If it is detected in real time that a channel is abnormal, when the common channel is flexibly configured on another normal channel online for transmission, a communication success rate can be greatly improved, and user experience can be improved.

Therefore, the embodiments of this application propose a new channel configuration method. In one embodiment, a base station configures an uplink channel and a downlink channel based on a quantity of users, a quantity of system flows, and/or a quantity of abnormal channels. The uplink channel is a radio frequency channel used for uplink transmission, and the downlink channel is a radio frequency channel used for downlink transmission. A radio frequency part of the base station processes and transmits radio frequency data based on the configured uplink channel and the configured downlink channel, and a baseband part of the base station processes and transmits baseband data based on the configured uplink channel and the configured downlink channel. While system transmission performance is ensured, a communication requirement can be flexibly met, and system processing resources and transmission resources can be saved.

In one embodiment, it is assumed that the radio frequency part has N radio frequency channels, and the uplink channel and the downlink channel may be configured by using the following three embodiments. Embodiment 1: An abnormal channel is determined, where a quantity of abnormal channels is n1; and the uplink channel and the downlink channel are determined based on the abnormal channel, where a quantity of uplink channels meets M1=N−n1, a quantity of downlink channels meets M2≤M1, or M2=N−n1, and M1≤M2. Embodiment 2: A quantity of system flows is determined; and the uplink channel and the downlink channel are determined based on the quantity of system flows, where 1≤M1≤N, and 1≤M1≤N. Embodiment 3: An abnormal channel is determined, where a quantity of abnormal channels is n1, and a quantity of normal channels is n2=N−n1; a quantity of system flows is determined; and the uplink channel and the downlink channel are determined based on the abnormal channel and the quantity of system flows, where 1≤M1≤N2≤N, and 1≤M2≤N2≤N. In one embodiment, the abnormal channel may be determined by detecting a channel. Detecting a channel (or referred to as channel detection) includes sending a test signal on the channel to detect communication quality of the channel. A channel with poor communication quality may be determined as the abnormal channel. The base station may determine a user and a quantity of users through random access channel random access channel, (RACH) detection, configure a parameter (for example, a quantity of user flows) based on a rank of the user, and determine the quantity of system flows by using a scheduling algorithm. Compared with embodiment 2, the embodiment 3 excludes the abnormal channel. In other words, embodiment 3 needs to ensure that M1≤n2 and M2≤n2.

The quantity of system flows described in the foregoing embodiment includes a quantity of downlink system flows and a quantity of uplink system flows. For embodiment 2 and embodiment 3, a quantity M11 of uplink channels and a quantity M12 of downlink channels are obtained by performing calculation or table lookup based on the quantity of downlink system flows, and a quantity M21 of uplink channels and a quantity M22 of downlink channels are obtained by performing calculation or table lookup based on the quantity of uplink system flows. The determined quantity of uplink channels meets M1=max(M11, M21), and the quantity of downlink channels meets M2=max(M12, M22), where max(x, y) represents selecting a larger value from x and y.

The RACH detection, the channel detection, and the determining of the uplink channel and the downlink channel described in the foregoing embodiments may be performed by a remote entity. When there is no remote entity, or a function of the remote entity is integrated into the baseband part, the RACH detection, the channel detection, and the determining of the uplink channel and the downlink channel may be performed by the baseband part. For example, the BBU in FIG. 1, the remote entity in FIG. 2, and the baseband part in FIG. 2a can all be used to perform the RACH detection, the channel detection, and the determining of the uplink channel and the downlink channel. The quantity of users described in the foregoing embodiments may be a quantity of users who have performed access, or a quantity of users who have performed access and a quantity of users who are to perform access (for example, a quantity of users on which a RACH signal is detected and who are not synchronized with the base station).

In the foregoing embodiments, if a quantity of radio frequency channels that can be configured is greater than or equal to M1 or M2, first M1 or M2 radio frequency channels may be selected, or M1 or M2 radio frequency channels with better communication conditions are selected (for example, M1 or M2 radio frequency channels with higher signal-to-noise ratios are selected). Selection may also be performed in another manner based on an actual situation, and this is not limited in the embodiments of this application. An unselected radio frequency channel may be set to a sleep state, or is used to transmit a small quantity of messages.

In the foregoing embodiments, the uplink channel and the downlink channel may be periodically determined, may be determined in real time, or may be adaptively determined in a state of emergency (for example, human intervention or manual operation).

In the multicarrier scenario, each carrier may have a different access user and uses a different air interface technology. Therefore, an uplink channel and a downlink channel of each carrier may be determined based on the foregoing embodiments. Different carriers may have a same quantity or different quantities of uplink channels, and a same quantity or different quantities of downlink channels. For example, in a bandwidth of 200 M, there may be 10 carriers if a bandwidth of one carrier is 20 M. It is assumed that each carrier may have a maximum of N (for example, N is 256 or another value) radio frequency channels used for transmission. In an implementation, n carriers may be used for LTE transmission, and each of the n carriers uses M1 radio frequency channels for receiving and M2 radio frequency channels for sending (M1<N and M2<N). (10-n) carriers are used for massive MIMO transmission, and uplink channels and downlink channels used by the (10-n) carriers are independently determined (in other words, each carrier may have an independent channel configuration embodiment), or each carrier uses M1 radio frequency channels for receiving and M2 radio frequency channels for sending. 0≤n≤10, and both M1 and M2 are less than or equal to N. Further, a channel configuration embodiment of the (10-n) carriers may also be correspondingly adjusted as a communication status changes. For example, a carrier that originally performs the LTE transmission by using M1 radio frequency channels for receiving and M2 radio frequency channels for sending may alternatively be configured as performing massive MIMO transmission by using M3 radio frequency channels for receiving and M4 radio frequency channels for sending. M3 and M4 are positive integers less than N.

After the uplink channel and the downlink channel are determined, the radio frequency part needs to be notified of information about the uplink channel and the downlink channel.

The base station shown in FIG. 1 is used as an example, and transmission is performed between the BBU and the RRU through a CPRI. The BBU determines an uplink channel and a downlink channel through RACH detection. A quantity of uplink channels is M1, and a quantity of downlink channels is M2. The BBU transmits information about the uplink channel and the downlink channel to the RRU through the CPRI. After receiving the information about the uplink channel and the downlink channel, the RRU receives an M1 channel data and sends an M2 channel data over an air interface. The M1 channel data and M2 channel data are also transmitted between the BBU and the RRU.

Alternatively, the base station shown in FIG. 2 is used as an example, and transmission may be performed between the baseband part and the radio frequency part through a network. The remote entity determines an uplink channel and a downlink channel through RACH detection. A quantity of uplink channels is M1, and a quantity of downlink channels is M2. The remote entity transmits information about the uplink channel and the downlink channel to the radio frequency part and the baseband part. After receiving the information about the uplink channel and the downlink channel, the radio frequency part receives an M1 channel data and sends an M2 channel data over an air interface. The M1 channel data and M2 channel data are also transmitted between the baseband part and the radio frequency part.

Alternatively, the base station shown in FIG. 2a is used as an example, and the baseband part determines an uplink channel and a downlink channel through RACH detection. A quantity of uplink channels is M1, and a quantity of downlink channels is M2. The baseband part transmits information about the uplink channel and the downlink channel to the radio frequency part. After receiving the information about the uplink channel and the downlink channel, the radio frequency part transmits M1 channel data and M2 channel data over an air interface. M1 channel data and M2 channel data are also transmitted between the baseband part and the radio frequency part.

In a process of transmitting data by using the radio frequency channel, the channel needs to be corrected, to ensure higher reliability and communication quality in real time. It is assumed that a quantity of radio frequency channels is N, a quantity of determined uplink channels is M1, and a quantity of determined downlink channels is M2. In a possible implementation, N radio frequency channels are still corrected regardless of the quantity of determined uplink channels and the quantity of determined downlink channels. In this implementation, all radio frequency channels may be periodically enabled for real-time channel correction, and a channel status of each radio frequency channel is recorded for subsequent channel configuration. For example, a signal-to-noise ratio of the radio frequency channel may be recorded to subsequently select a radio frequency channel with a higher signal-to-noise ratio for data transmission. In another possible implementation, the M1 uplink channels and the M2 downlink channels may be corrected. In this implementation, channel correction may be periodically performed, or channel correction may be performed when the uplink channel and the downlink channel change. Alternatively, on the basis of periodically performing channel correction, channel correction is also performed when the uplink channel and the downlink channel change.

It should be noted that channel correction means synchronizing a plurality of radio frequency channels in terms of time and/or frequency.

While data is transmitted by using a configured radio frequency channel, to-be-transmitted data may further be compressed, so that transmission load can be further reduced. For example, the BBU or the baseband part compresses to-be-sent data, and transmits the compressed data to the RRU or the radio frequency part. Alternatively, the RRU or the radio frequency part compresses data that is received from the air interface, and transmits the compressed data to the BBU or the baseband part. This can reduce data transmitted between the BBU and the RRU, or reduce data transmitted between the baseband part and the radio frequency part, thereby saving transmission resources.

In this embodiment of this application, a relatively small quantity of radio frequency channels are configured when a relatively small quantity of users or no user performs access, so that data transmission and calculation on a base station side (for example, between the baseband part and the radio frequency part, or between the radio frequency part and the air interface) can be reduced. When some channels are abnormal, a channel may be adaptively configured online in real time for receiving and sending, to reduce data receiving, sending, and processing on the abnormal channels. In addition, an unused radio frequency channel is set to a sleep state or for another purpose, so that the base station side can adaptively configure the radio frequency part.

With reference to the accompanying drawings, the following further describes how the base station configures an uplink channel and a downlink channel based on a quantity of users, a quantity of system flows, and/or a quantity of abnormal channels.

Figure 3:
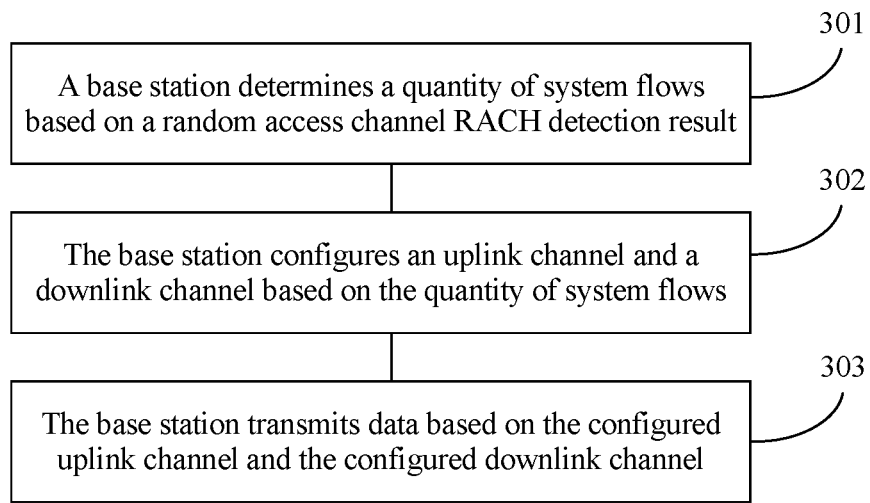
FIG. 3 shows a channel configuration method according to an embodiment of this application.

FIG. 3 shows a channel configuration method 300 according to an embodiment of this application. As shown in FIG. 3, the method 300 includes operation 301, operation 302, and operation 303.

Operation 301: A base station determines a quantity of system flows based on a random access channel (RACH) detection result.

In one embodiment, the base station determines a quantity of users through RACH detection. The quantity of system flows is determined based on a rank parameter configured by the base station for each user, for example, a quantity of flows supported by each user. For example, if a quantity of users determined by the base station is L1, and a quantity of flows supported by each user is L2, the quantity of system flows may be L1×L2. Both L1 and L2 are integers greater than or equal to 1. Each user may support a different quantity of flows, and the quantity of system flows may be a sum of quantities of flows supported by all users.

Operation 302: The base station configures an uplink channel and a downlink channel based on the quantity of system flows.

In one embodiment, configuring the uplink channel and the downlink channel includes configuring a quantity M1 of uplink channels, corresponding M1 channels used for receiving, a quantity M2 of downlink channels, and corresponding M2 channels used for sending.

First, the quantity of uplink channels and the quantity of downlink channels need to be determined. It is assumed that the quantity of system flows is F, and a quantity of radio frequency channels is N, where both F and N are integers greater than or equal to 1, and F is not greater than a maximum quantity of supported system flows that is configured by a system. In this case, the quantity M1 of uplink channels and the quantity M2 of downlink channels are determined in the following two manners.

Manner 1: If ceil(F×X)≤N, M1=M2=ceil(F×X); otherwise, M1=M2=N. Ceil( ) is a ceiling function, and X is a coefficient configured by the base station.

Manner 2: M1 and M2 are determined based on F and a correspondence between M1 and M2 and F, but it needs to ensure that M1≤N and M2≤N. In other words, if M1 and M2 are greater than N, M1=M2=N. The correspondence between M1, M2 and F may be presented in a form of a table, for example, Table 1. When X1=0, Table 2 may be obtained.

TABLE 1

Table of a correspondence between a range of F and M1 and M2

| Serial number | Range of F | M1/M2 (M1 ≤ N, M2 ≤ N) |
|---|---|---|
| 1 | X1 < F ≤ (X2 = X1 + (2 * 1)) | M1 = M2 = 2 * X2 |
| 2 | X2 < F ≤ (X3 = X2 + (2 * 1)) | M1 = M2 = 2 * X3 |
| 3 | X3 < F ≤ (X4 = X3 + (2 * 2)) | M1 = M2 = 2 * X4 |
| 4 | X4 < F ≤ (X5 = X4 + (2 * 2)) | M1 = M2 = 2 * X5 |
| 5 | X5 < F ≤ (X6 = X5 + (2 * 3)) | M1 = M2 = 2 * X6 |
| 6 | X6 < F ≤ (X7 = X6 + (2 * 3)) | M1 = M2 = 2 * X7 |
| 7 | X7 < F ≤ (X8 = X7 + (2 * 4)) | M1 = M2 = 2 * X8 |
| ... | ... | ... |

TABLE 2

Table of a correspondence between a range of F and M1 and M2 when X1 = 0

| Serial number | Range of F | M1 and M2 |
|---|---|---|
| 1 | 0 < F ≤ 2 | M1 = M2 = 4 |
| 2 | 2 < F ≤ 4 | M1 = M2 = 8 |
| 3 | 4 < F ≤ 8 | M1 = M2 = 16 |
| 4 | 8 < F ≤ 12 | M1 = M2 = 24 |
| 5 | 12 < F ≤ 18 | M1 = M2 = 36 |
| 6 | 18 < F ≤ 24 | M1 = M2 = 48 |
| 7 | 24 < F ≤ 32 | M1 = M2 = 64 |

It should be understood that in Table 1 or Table 2, the range of F and values of M1 and M2 may be flexibly set based on an actual situation. For example, values of M1 and M2 may be different. In addition to the foregoing two embodiments, another embodiment for determining a quantity of uplink channels and a quantity of downlink channels may also be used provided that the base station can adaptively configure the quantity of uplink channels and the quantity of downlink channels.

In one embodiment, the quantity of uplink channels and the quantity of downlink channels may be separately determined based on an uplink massive MIMO scenario and a downlink massive MIMO scenario. In the downlink massive MIMO scenario, it is assumed that a quantity of downlink system flows is F1, and a quantity M11 of uplink channels and a quantity M12 of downlink channels in downlink massive MIMO may be determined in the foregoing manners (or another manner). In the uplink massive MIMO scenario, it is assumed that a quantity of uplink system flows is F2, and a quantity M21 of uplink channels and a quantity M22 of downlink channels in uplink massive MIMO may be determined in the foregoing manners (or another manner). Therefore, the quantity of uplink channels that is configured by the base station may be max(M11, M21), and the quantity of downlink channels may be max(M12, M22).

In one embodiment, the base station may determine an abnormal channel. After excluding the abnormal channel, the base station configures the uplink channel and the downlink channel based on remaining channels. Alternatively, the base station does not take the abnormal channel into consideration when configuring the uplink channel and the downlink channel.

Then, corresponding uplink channels and downlink channels are determined based on the quantity of uplink channels and the quantity of downlink channels. For example, if the quantity of uplink channels is M1, and the quantity of downlink channels is M2, first M1 radio frequency channels may be selected from available radio frequency channels as uplink channels, and first M2 radio frequency channels are selected as downlink channels; or last M1 radio frequency channels may be selected from available radio frequency channels as uplink channels, and last M2 radio frequency channels are selected as downlink channels; or M1 radio frequency channels with a largest signal-to-noise ratio may be selected as uplink channels, and M2 radio frequency channels with a largest signal-to-noise ratio are selected as downlink channels.

Operation 303: The base station transmits data based on the configured uplink channel and the configured downlink channel.

In one embodiment, data needs to be transmitted between the base station and an air interface, and between a baseband part and a radio frequency part of the base station based on the configured uplink channel and the configured downlink channel. When the base station includes a remote entity, data also needs to be transmitted between the baseband part and the remote entity, and between the radio frequency part and the remote entity based on the configured uplink channel and the configured downlink channel. For example, if it is determined that the uplink channels are the first M1 channels in all the radio frequency channels, the radio frequency part receives M1 channel data from the air interface, the radio frequency part sends the M1 channel data to the remote entity, and the remote entity also sends the M1 channel data to the baseband part.

It can be seen from FIG. 1, FIG. 2, and FIG. 2a, and descriptions related to FIG. 1, FIG. 2, and FIG. 2a that the base station has two structures, one structure includes the remote entity, and the other structure does not include the remote entity. Channel configuration procedures in the two structures are described below with reference to the accompanying drawings.

Figure 4:
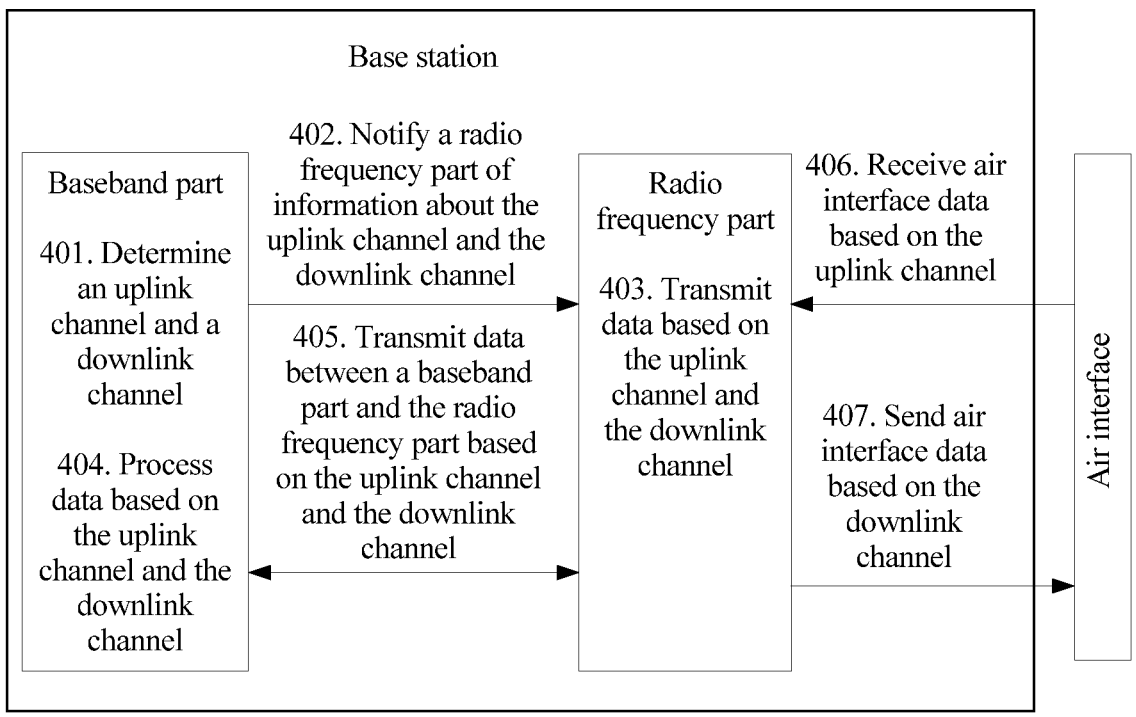
FIG. 4 is a schematic flowchart of a channel configuration method in which a base station does not include a remote entity.

FIG. 4 is a schematic flowchart of a channel configuration method in which a base station does not include a remote entity. Transmission may be performed between a baseband part and a radio frequency part through a network. In other words, the baseband part and the radio frequency part may be decoupled, and may be not in a one-to-one correspondence. The method shown in FIG. 4 includes the following operations.

Operation 401: The baseband part determines an uplink channel and a downlink channel.

Operation 402: The baseband part notifies the radio frequency part of information about the uplink channel and the downlink channel.

Operation 403: The radio frequency part transmits data based on the uplink channel and the downlink channel.

Operation 404: The baseband part processes data based on the uplink channel and the downlink channel.

Operation 405: Transmit data between the baseband part and the radio frequency part based on the uplink channel and the downlink channel.

Operation 406: The radio frequency part receives air interface data based on the uplink channel.

Operation 407: The radio frequency part sends air interface data based on the downlink channel.

In one embodiment, the baseband part of the base station determines the uplink channel and the downlink channel through RACH detection. The baseband part sends a message to the radio frequency part, and the message carries the information about the uplink channel and the downlink channel. After receiving the message, the radio frequency part receives and sends data based on the uplink channel and the downlink channel. The baseband part processes and transmits the data based on the uplink channel and the downlink channel. After both the baseband part and the radio frequency part learn the determined uplink channel and the determined downlink channel, data may be transmitted between the baseband part and the radio frequency part, and between the radio frequency part and the air interface based on the determined uplink channel and the determined downlink channel. Therefore, there is no necessary sequence for performing operation 404 to operation 407. Further, the baseband part may be a BBU, and the radio frequency part may be an RRU.

Figure 5A:
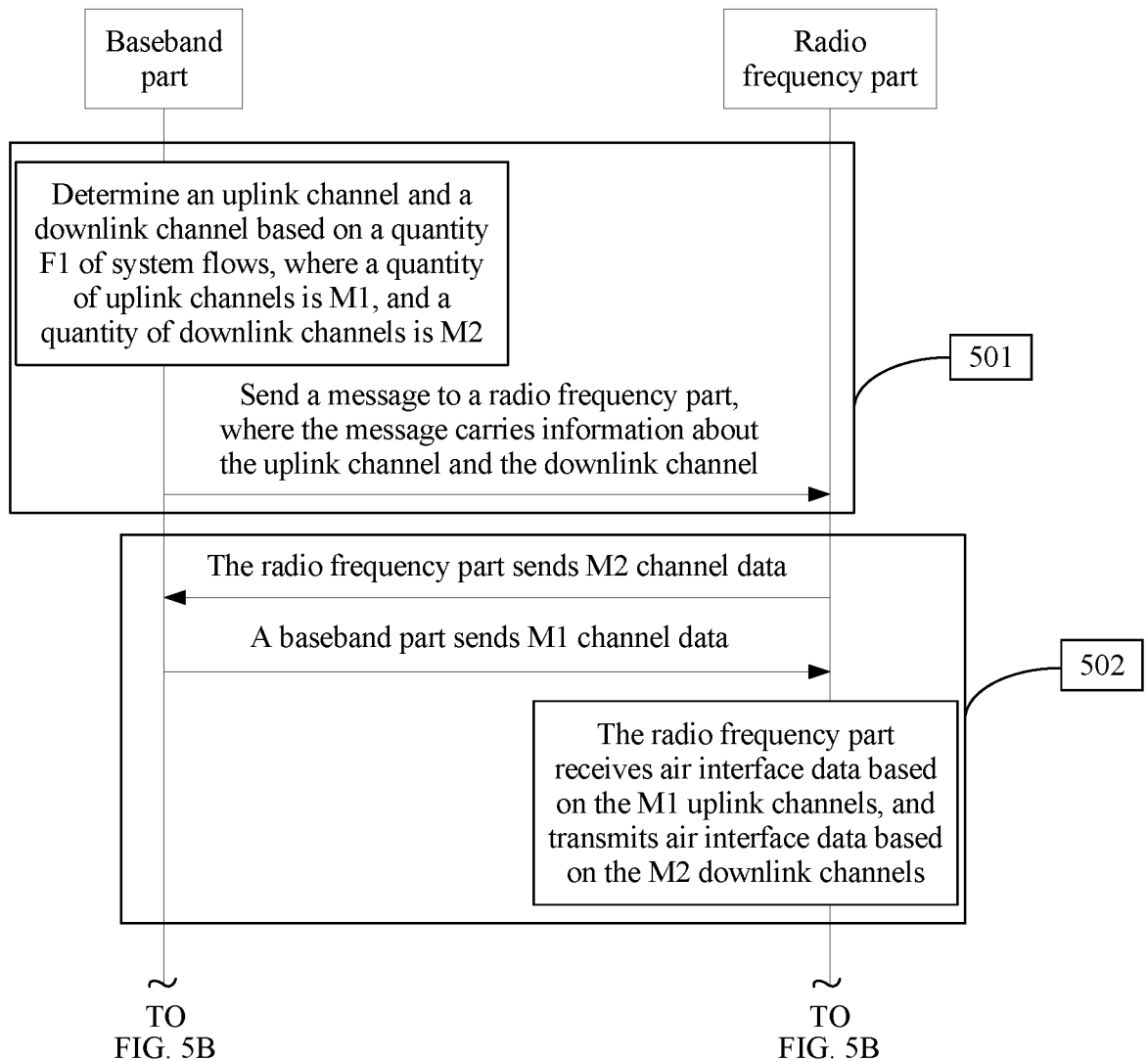
FIG. 5A and FIG. 5B are a schematic flowchart of a channel configuration method according to an embodiment of this application.
Figure 5B:
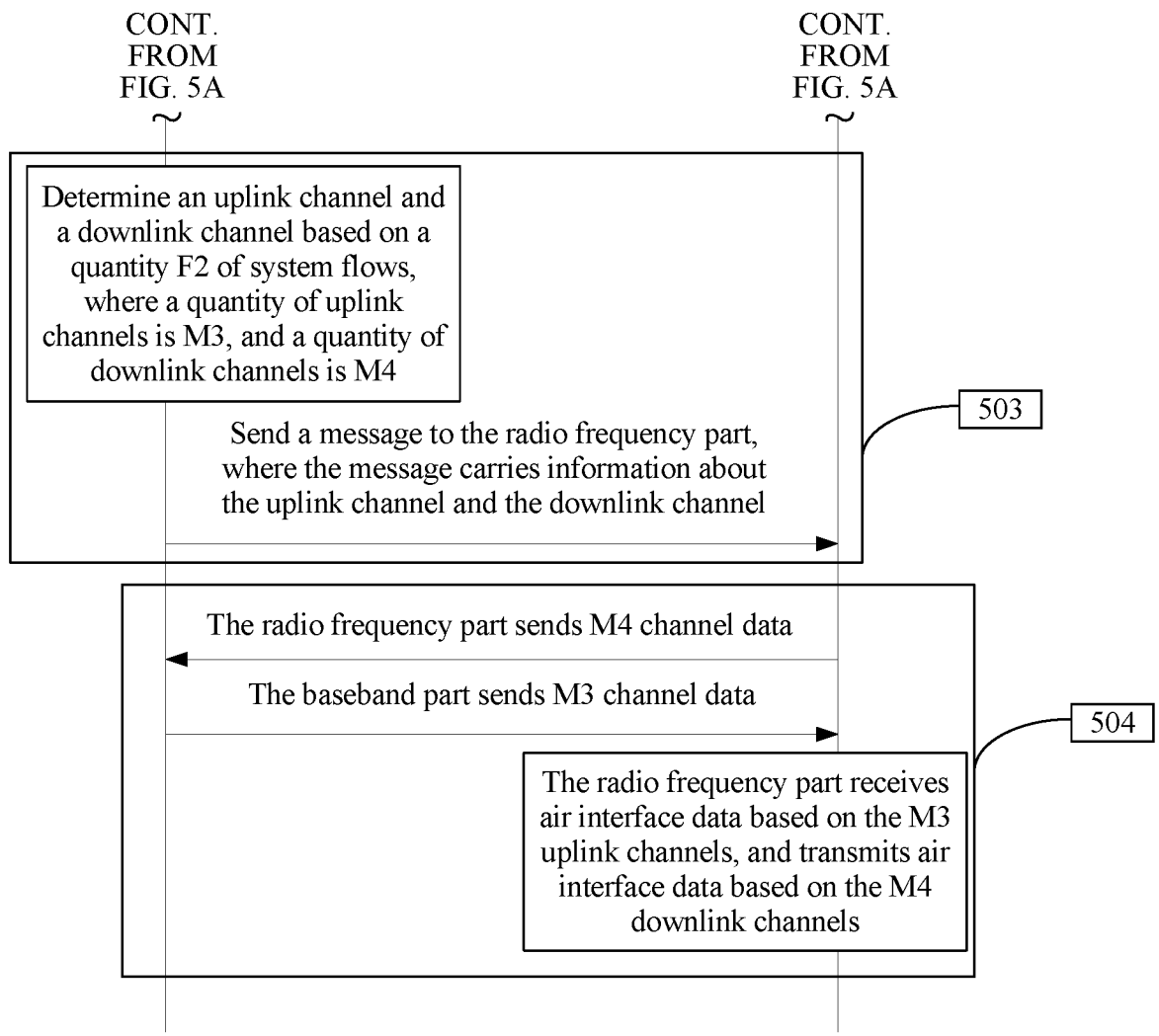

For a case in which a base station does not include a remote entity, an embodiment of this application further provides a channel configuration method. FIG. 5A and FIG. 5B are a schematic flowchart of the method. An embodiment of this application is described below with reference to FIG. 5A and FIG. 5B.

In part 501, a baseband part determines an uplink channel and a downlink channel based on a quantity F1 of system flows, where a quantity of uplink channels is M1, and a quantity of downlink channels is M2. The baseband part sends a message to a radio frequency part, and the message carries information about the uplink channel and the downlink channel.

In part 502, the radio frequency part transmits data based on the M1 uplink channels and the M2 downlink channels. Specifically, the radio frequency part sends M2 channel data to the baseband part. The baseband part sends M1 channel data to the radio frequency part. The radio frequency part may also transmit air interface data based on the M1 uplink channels and the M2 downlink channels. It should be noted that in part 502, an execution order of the steps is not limited.

A channel configuration embodiment may be updated as an access user changes or when a preset period condition is met. Therefore, in part 503, the baseband part may redetermine the uplink channel and the downlink channel based on a new quantity F2 of system flows. It should be noted that for a specific implementation of part 503, refer to part 501, and for a specific implementation of part 504, refer to part 502. Details are not described herein again. F1, M1, M2, F1, M3, and M4 are all integers greater than or equal to 1.

For example, the radio frequency part includes 64 channels, to further describe FIG. 5A and FIG. 5B.

It is assumed that 12 users perform access, and each user supports two flows. During initialization, the base station can be preconfigured by a system to transmit data by using two uplink channels and two downlink channels. After the base station is initialized, the baseband part performs RACH detection. When 12 users perform access (or are to perform access), each user supports two flows, and in this case, the quantity of system flows is 24. The baseband part determines, based on the quantity of system flows (namely, 24), to transmit data by using 64 uplink channels and 64 downlink channels. The baseband part sends a message to the radio frequency part, and the message carries information about the 64 uplink channels and the 64 downlink channels. The radio frequency part transmits data based on the 64 uplink channels and the 64 downlink channels. After a period of time, the quantity of users who perform access (or are to perform access) changes to 8. The baseband part determines, based on the quantity of system flows (namely, 16) to transmit data by using 24 uplink channels and 24 downlink channels. The baseband part notifies the radio frequency part of information about the 24 uplink channels and the 24 downlink channels. The baseband part and the radio frequency part transmit data based on the 24 uplink channels and the 24 downlink channels. The base station flexibly configures the uplink channel and the downlink channel based on an actual need. This can reduce a calculation amount of the baseband part, and reduce an amount of data transmitted between the baseband part and the radio frequency part. The base station may further dynamically allocate calculation resources, and use redundant calculation resources for another purpose, or be set to a sleep state or a power saving state to reduce power consumption when the base station is not used for another purpose. After a period of time, when the quantity of users who perform access (or are to perform access) increases, a quantity of receiving and sending channels is increased, so that the base station can effectively transmit and process data in a timely manner.

Figure 6:
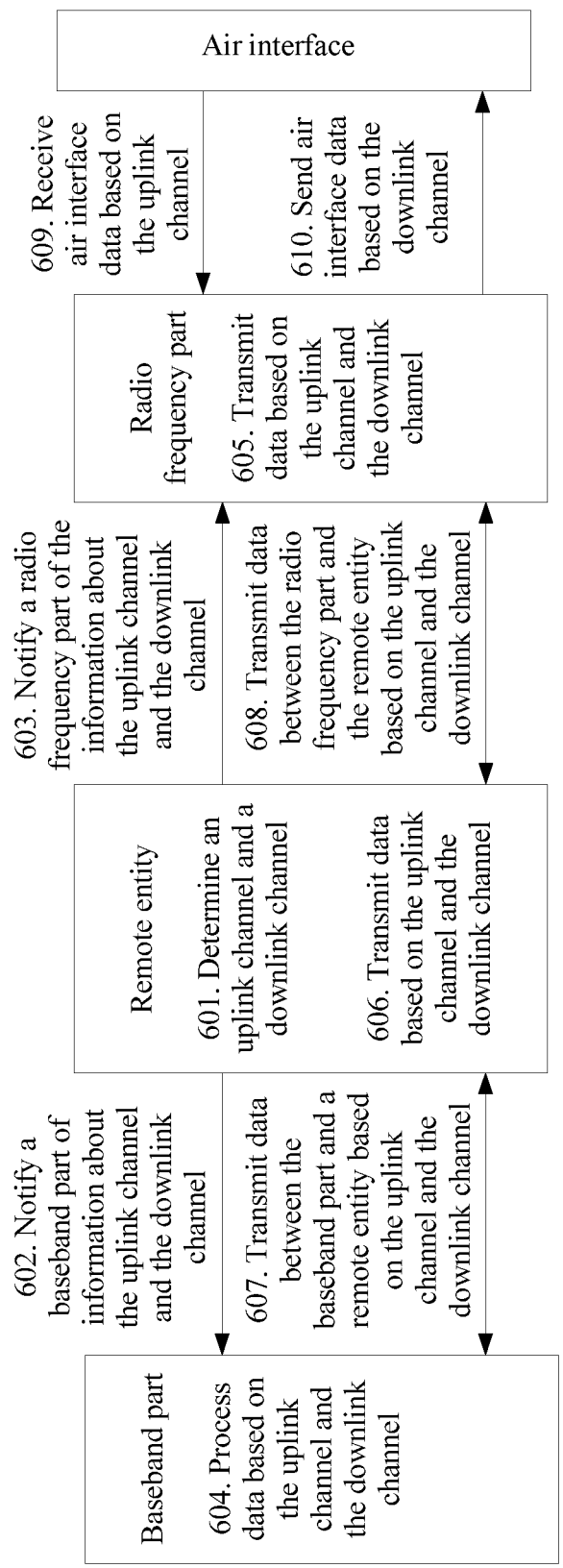
FIG. 6 is a schematic flowchart of a channel configuration method in which a base station includes a remote entity.

FIG. 6 is a schematic flowchart of a channel configuration method in which a base station includes a remote entity. Transmission may be performed between a baseband part and the remote entity through a network. In other words, the baseband part and the remote entity may be decoupled, and may be not in a one-to-one correspondence. Therefore, the baseband part and a radio frequency part may also be decoupled, and may be not in a one-to-one correspondence. The method shown in FIG. 6 includes the following operations.

Operation 601: The remote entity determines an uplink channel and a downlink channel.

Operation 602: The remote entity notifies the baseband part of information about the uplink channel and the downlink channel.

Operation 603: The remote entity notifies the radio frequency part of the information about the uplink channel and the downlink channel.

Operation 604: The baseband part processes data based on the uplink channel and the downlink channel.

Operation 605: The radio frequency part transmits data based on the uplink channel and the downlink channel.

Operation 606: The remote entity transmits data based on the uplink channel and the downlink channel.

Operation 607: Transmit data between the baseband part and the remote entity based on the uplink channel and the downlink channel.

Operation 608: Transmit data between the radio frequency part and the remote entity based on the uplink channel and the downlink channel.

Operation 609: The radio frequency part receives air interface data based on the uplink channel.

Operation 610: The radio frequency part sends air interface data based on the downlink channel.

Specifically, the baseband part and the radio frequency part may be connected through a network. The remote entity is disposed near the radio frequency part to implement some baseband functions. The remote entity may communicate with both the baseband part and the radio frequency part. The remote entity determines the uplink channel and the downlink channel through RACH detection. The remote entity separately sends a message to the baseband part and the radio frequency part, and the message carries the information about the uplink channel and the downlink channel. After the radio frequency part learns the information about the uplink channel and the downlink channel, the radio frequency part transmits data based on the uplink channel and the downlink channel. Data is received between the radio frequency part and an air interface and between the radio frequency part and the remote entity based on the uplink channel, and data is sent between the radio frequency part and the air interface and between the radio frequency part and the remote entity based on the downlink channel. After the baseband part learns the information about the uplink channel and the downlink channel, data is transmitted between the baseband part and the remote entity based on the uplink channel and the downlink channel.

Figure 7A:
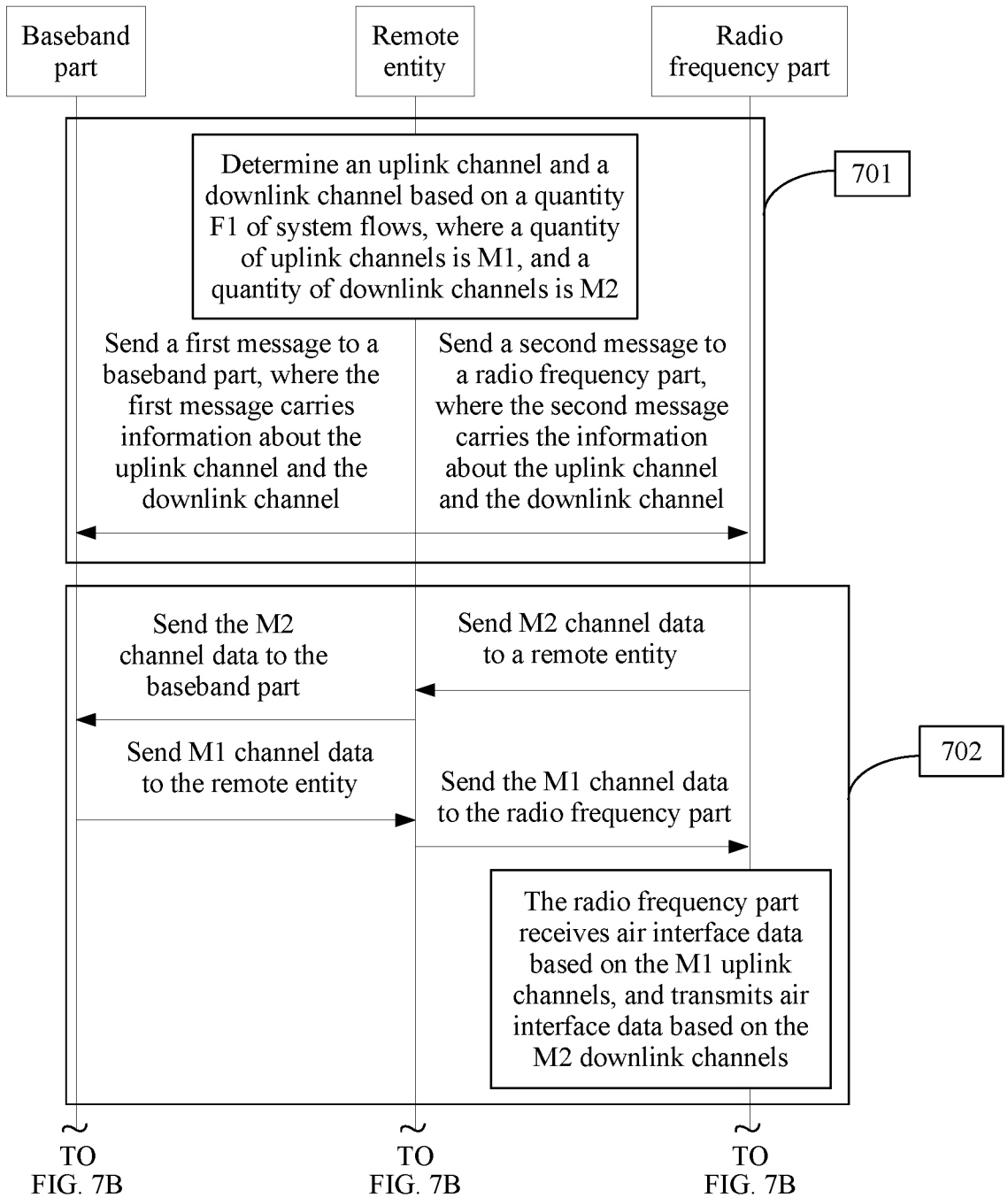
FIG. 7A and FIG. 7B are a schematic flowchart of a channel configuration method according to an embodiment of this application.
Figure 7B:
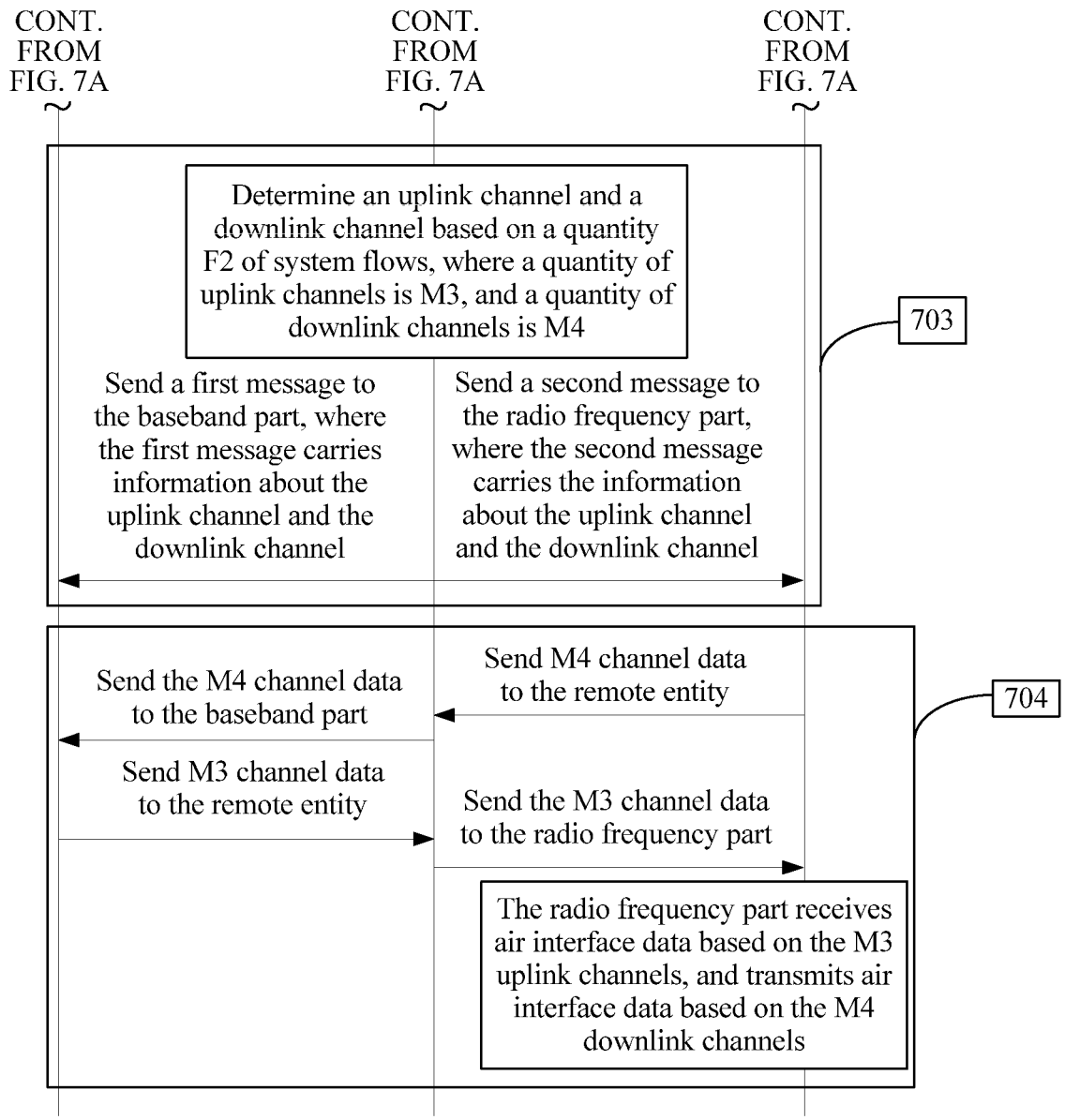

For a case in which a base station includes a remote entity, an embodiment of this application further provides a channel configuration method. FIG. 7A and FIG. 7B are a schematic flowchart of the method. This embodiment of this application is described below with reference to FIG. 7A and FIG. 7B.

In part 701, the remote entity determines an uplink channel and a downlink channel based on a quantity F1 of system flows. A quantity of uplink channels is M1, and a quantity of downlink channels is M2. The remote entity sends a first message to a baseband part, and sends a second message to a radio frequency part. The first message and the second message carry information about the uplink channel and the downlink channel. It should be noted that an execution order of sending the first message and the second message is not limited.

In part 702, data is transmitted between the baseband part, the remote entity, and the radio frequency part based on M1 uplink channels and M2 downlink channels. In one embodiment, the radio frequency part sends M2 channel data to the remote entity, and the remote entity sends the M2 channel data to the baseband part. The baseband part sends M1 channel data to the remote entity, and the remote entity sends the M1 channel data to the radio frequency part. The radio frequency part may also transmit air interface data based on the M1 uplink channels and the M2 downlink channels. It should be noted that in part 702, an execution order of the operations is not limited.

A channel configuration embodiment may be updated as a quantity of access users and/or the quantity of system flows changes or when a preset period condition is met. For example, if a preset system configuration period is T, the channel configuration embodiment is updated at intervals of time T. Faster change of the quantity of users and/or the quantity of system flows leads to a shorter preset period. Therefore, in part 703, the remote entity may redetermine the uplink channel and the downlink channel based on a new quantity F2 of system flows. It should be noted that for a specific implementation of part 703, refer to part 701, and for a specific implementation of part 704, refer to part 702. Details are not described herein again. F1, M1, M2, F1, M3, and M4 are all integers greater than or equal to 1.

For example, the radio frequency part includes 128 channels, to further describe FIG. 7A and FIG. 7B.

It is assumed that 24 users perform access, and each user supports two flows. During initialization, the base station can be preconfigured by a system to transmit data by using two uplink channels and two downlink channels. After the base station is initialized, the remote entity performs RACH detection. When 24 users perform access (or are to perform access), each user supports two flows, and in this case, the quantity of system flows is 48. The remote entity determines, based on the quantity of system flows (namely, 48), to transmit data by using 128 uplink channels and 128 downlink channels. The remote entity sends a first message to the baseband part, and the first message carries information about the 128 downlink channels and the 128 uplink channels. The remote entity sends a second message to the radio frequency part, and the second message carries the information about the 128 uplink channels and the 128 downlink channels. As shown in part 702 of FIG. 7A, the baseband part, the remote entity, and the radio frequency part transmit data based on the 128 uplink channels and the 128 downlink channels. After a period of time, the quantity of users who perform access (or are to perform access) changes to 8. The remote entity determines, based on the quantity of system flows (namely, 16), to transmit data by using 48 uplink channels and 48 downlink channels. The remote entity notifies the baseband part and the radio frequency part of information about the 48 uplink channels and the 48 downlink channels. As shown in part 704 of FIG. 7B, the baseband part, the remote entity, and the radio frequency part transmit data based on the 48 uplink channels and the 48 downlink channels. The base station flexibly configures the uplink channel and the downlink channel based on an actual need. This can reduce a calculation amount of the baseband part and the remote entity, and reduce an amount of data transmitted between the baseband part and the remote entity and between the remote entity and the radio frequency part. The base station may further dynamically allocate calculation resources, and use redundant calculation resources for another purpose, or be set to a sleep state or a power saving state to reduce power consumption when the base station is not used for another purpose. After a period of time, when the quantity of users who perform access (or are to perform access) increases, a quantity of receiving and sending channels is increased, so that the base station can effectively transmit and process data in a timely manner.

Figure 8:
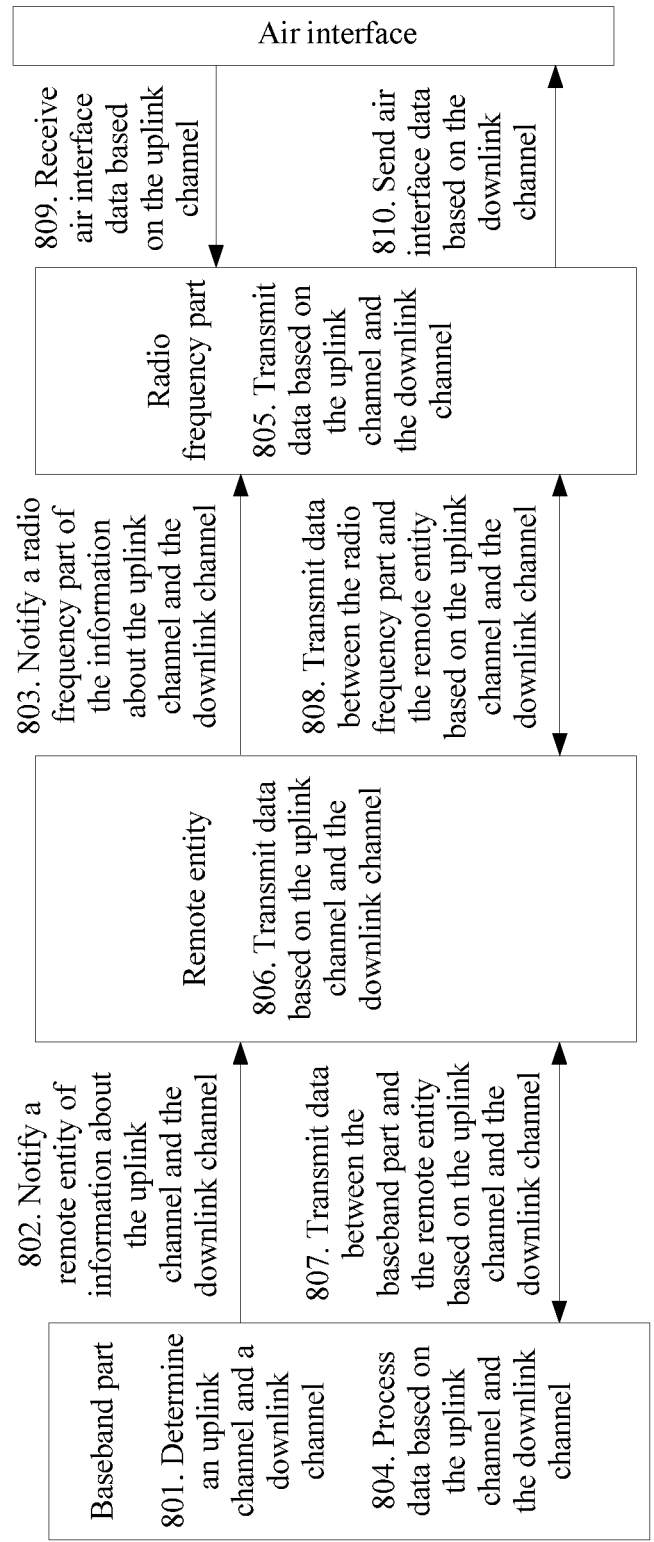
FIG. 8 is a schematic flowchart of another channel configuration method according to an embodiment of this application.

For a case in which a base station includes a remote entity, an embodiment of this application further provides another channel configuration method. FIG. 8 is a schematic flowchart of the method. As shown in FIG. 8, in the method, a baseband part determines an uplink channel and a downlink channel, and the remote entity receives information about the uplink channel and the downlink channel from the baseband part, and transmits the information to a radio frequency part. In the method shown in FIG. 8, the remote entity mainly performs transparent transmission between the baseband part and the radio frequency part. Operation 803 to operation 810 are the same as or similar to operation 603 to operation 610 in FIG. 6. For related features, refer to FIG. 6 and descriptions of FIG. 6. Details are not described herein again.

It should be noted that methods or embodiments shown in FIG. 3 to FIG. 8 are scenarios of one carrier. For a scenario of a plurality of carriers, refer to the foregoing embodiment. Specifically, the foregoing operations may be performed on each of the plurality of carriers, to obtain a processing method for each of the plurality of carriers. In these methods and embodiments, uplink and downlink are not differentiated either. Specifically, the foregoing method may be separately performed for uplink communication and downlink communication.

For the base station structure shown in FIG. 1, after determining the uplink channel and the downlink channel, the BBU needs to send a message to notify the RRU, and the BBU communicates with the RRU through a CPRI. A frame transmitted on the CPRI is referred to as a super frame, and one super frame includes 256 basic frames. FIG. 9 is a schematic diagram of a frame structure of a basic frame. As shown in FIG. 9, one basic frame includes a 4-byte control field and a 60-byte data field. In one super frame, a large quantity of control fields of a basic frame are reserved (or unused). Therefore, information about the determined uplink channel and the determined downlink channel may be transmitted by using the reserved control fields of the basic frame. A third basic frame in a super frame is used as an example, and a frame structure of the basic frame may be shown in FIG. 8. It is assumed that a control field of the basic frame is reserved, and a byte 1 to a byte 4 of the control field may be all used to transmit the information about the determined uplink channel and the determined downlink channel. For example, when the byte 1 of the control field of the basic frame is all 0s (or a first value), it indicates that a radio frequency channel 0 is used as an uplink channel; and when the byte 1 of the control field of the basic frame is all 1s (or a second value), it indicates that the radio frequency channel 0 is not used as an uplink channel. When the byte 2 of the control field of the basic frame is all 0s (or the first value), it indicates that a radio frequency channel 1 is used as a downlink channel; and when the byte 2 of the control field of the basic frame is all 1s (or the second value), it indicates that the radio frequency channel 1 is not used as a downlink channel. Similarly, when an $n^{th}$ basic frame in a super frame is reserved, a control field of the $n^{th}$ basic frame may be set to determine whether a radio frequency channel m is used as an uplink channel, and whether a radio frequency channel (m+1) is used as a downlink channel. A control field of a reserved basic frame may carry only information about the uplink channel or only information about the downlink channel. In addition, a control field of a reserved basic frame may carry information about more or fewer channels based on an actual need. This is not limited in this embodiment of this application. When receiving a super frame, the RRU may determine the uplink channel and the downlink channel by parsing a control field of a basic frame in the super frame. If a radio frequency channel is not used, the RRU may not receive or send air interface data over the unused radio frequency channel. The BBU may process data based on a used radio frequency channel. Alternatively, when sending data, the BBU fills 0 or invalid data into a data field of a basic frame transmitted on the unused radio frequency channel.

For the base station structure shown in FIG. 2, when the base station includes the remote entity, after determining the uplink channel and the downlink channel, the remote entity needs to send a message to notify the baseband part or the radio frequency part. A radio remote system radio remote system, (RRS) and a radio cloud center radio cloud center, (RCC) are set in a next-generation fronthaul interface next-generation fronthaul interface, (NGFI) architecture. The RRS includes an RRU and some front-end baseband function modules. The RRU in the RRS may be used as the radio frequency part, some front-end baseband function modules in the RRS may be used as remote entities, and the RCC may be used as the baseband part. Alternatively, when the base station does not include the remote entity, after determining the uplink channel and the downlink channel, the baseband part needs to send a message to notify the radio frequency part. In an NGFI architecture, the RRS may be used as the radio frequency part, and the RCC may be used as the baseband part. The base station shown in FIG. 2 is configured to send a message carrying the information about the uplink channel and the downlink channel, and the information includes an uplink channel quantity field, a downlink channel quantity field, an uplink channel indication field, and a downlink channel indication field. FIG. 10 is a schematic diagram of a message used to carry information about an uplink channel and a downlink channel. As shown in FIG. 10, an uplink channel quantity field is used to indicate a quantity of uplink channels, and an uplink channel indication field is used to indicate that a corresponding quantity of channels are used as uplink channels. A downlink channel quantity field is used to indicate a quantity of downlink channels, and a downlink channel indication field is used to indicate that a corresponding quantity of channels are used as downlink channels. In addition, a length field and a type field are optional fields. The length field is used to indicate a length of the message, and the type field is used to indicate a type of the message.

FIG. 11 is a schematic diagram of a baseband part according to an embodiment of this application. As shown in FIG. 11, the baseband part includes a transceiver 1101, a processor 1102, and a baseband processing board 1103. The transceiver 1101 may be configured to support the baseband part in communicating with the remote entity or the radio frequency part in the foregoing embodiments. The processor 1102 may be configured to perform a function related to the baseband part in the foregoing embodiments. The baseband processing board 1103 is configured to perform baseband processing on data. Some technical features of the baseband part when the baseband part implements functions in the foregoing embodiments, for example, an uplink channel, a downlink channel, and a quantity of system flows, are similar to or correspond to some technical features in the foregoing method embodiments. Details are not described herein again.

Figure 12:
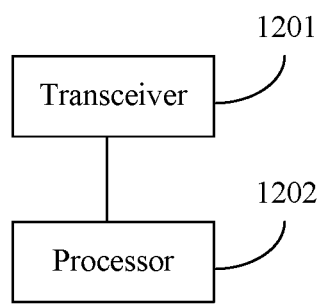
FIG. 12 is a schematic diagram of a possible structure of a remote entity according to an embodiment of this application.

FIG. 12 is a schematic diagram of a remote entity according to an embodiment of this application. As shown in FIG. 12, the remote entity includes a transceiver 1201 and a processor 1202. The transceiver 1201 may be configured to support the remote entity in communicating with the baseband part or the radio frequency part in the foregoing embodiments. The processor 1202 may be configured to perform a function related to the remote entity in the foregoing embodiments. Some technical features of the remote entity when the remote entity implements functions in the foregoing embodiments, for example, an uplink channel, a downlink channel, and a quantity of system flows, are similar to or correspond to some technical features in the foregoing method embodiments. Details are not described herein again.

Figure 13:
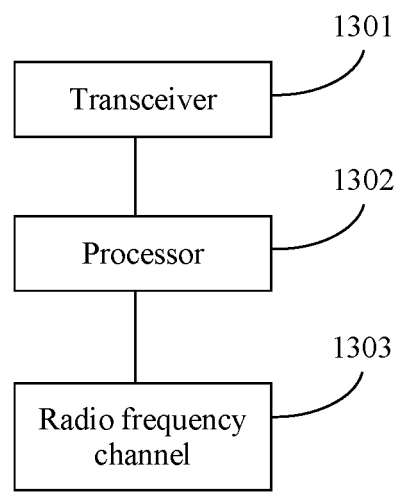
FIG. 13 is a schematic diagram of a possible structure of a radio frequency part according to an embodiment of this application.

FIG. 13 is a schematic diagram of a possible structure of a radio frequency part according to an embodiment of this application. As shown in FIG. 13, the radio frequency part includes a transceiver 1301, a processor 1302, and a radio frequency channel 1303. The transceiver 1301 may be configured to support the radio frequency part in communicating with the baseband part or the radio frequency part in the foregoing embodiments. The processor 1302 may be configured to perform a function related to the radio frequency part in the foregoing embodiments. The radio frequency channel 1303 is configured to transmit a radio frequency signal. Some technical features of the radio frequency part when the radio frequency part implements functions in the foregoing embodiments, for example, an uplink channel, a downlink channel, and a quantity of system flows, are similar to or correspond to some technical features in the foregoing method embodiments. Details are not described herein again.

It should be understood that the processor in this embodiment of this application may be implemented by a processing module, and the transceiver may be implemented by a transceiver module.

An embodiment of this application further provides a base station, and the base station includes the baseband part shown in FIG. 11 and the radio frequency part shown in FIG. 13. The base station may further include the remote entity shown in FIG. 12. It may be understood that the base station may include any quantity of transmitters, receivers, processors, controllers, memories, communications units, or the like, and all base stations that can implement this application are within the protection scope of this application.

Further, an embodiment of this application provides a base station. The base station includes a processor and a transceiver. The processor is configured to: determine a quantity of system flows based on a random access channel (RACH) detection result, and configure an uplink channel and a downlink channel based on the quantity of system flows, where the uplink channel is a radio frequency channel used for uplink transmission, and the downlink channel is a radio frequency channel used for downlink transmission. The transceiver is configured to transmit data based on the configured uplink channel and the configured downlink channel. The processor may include a baseband processing module and a radio frequency processing module. The baseband processing module is configured to implement a function of the baseband part in the foregoing method embodiments, and the radio frequency processing module is configured to implement a function of the radio frequency part in the foregoing method embodiments. The processor may further include a remote processing module, and the remote processing module is configured to implement a function of the remote entity.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm operations of examples described in combination with the embodiments disclosed in this specification can be implemented by electronic hardware or a combination of computer software and electronic hardware. Whether the functions are performed by hardware or software depends on particular applications and design constraints of the embodiments. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A channel configuration method, comprising:
   determining, by a base station, a quantity of system flows based on a random access channel (RACH) detection result, wherein the base station comprises a baseband part and a radio frequency part;
   configuring, by the base station, an uplink channel and a downlink channel based on the quantity of system flows comprising:
   determining a quantity of uplink channels and a quantity of downlink channels based on the quantity of system flows;
   determining, by the baseband part, the uplink channel based on the quantity of uplink channels;
   determining, by the baseband part, the downlink channel based on the quantity of downlink channels;
   notifying, by the baseband part, the radio frequency part of information about the uplink channel and the downlink channel; and
   determining, by the radio frequency part, the uplink channel and the downlink channel based on the information about the uplink channel and the downlink channel, wherein the uplink channel is a radio frequency channel used for uplink transmission, and the downlink channel is a radio frequency channel used for downlink transmission; and
   transmitting, by the base station, data based on the configured uplink channel and the configured downlink channel.

2. The method according to claim 1, wherein the base station further comprises a remote entity; and wherein
   configuring the uplink channel and the downlink channel based on the quantity of system flows comprises:
   determining, by the remote entity, the uplink channel and the downlink channel based on the quantity of system flows;
   notifying, by the remote entity, the baseband part and the radio frequency part of information about the uplink channel and the downlink channel; and
   determining, by the radio frequency part, the uplink channel and the downlink channel based on the information about the uplink channel and the downlink channel.

3. The method according to claim 1, in a multicarrier communication scenario, wherein determining a quantity of system flows based on a RACH detection result comprises determining a quantity of system flows of each of a plurality of carriers based on a RACH detection result of each of the plurality of carriers; wherein
   configuring the uplink channel and the downlink channel based on the quantity of system flows comprises configuring, by the base station, an uplink channel and a downlink channel of each of the plurality of carriers based on the quantity of system flows of each of the plurality of carriers; and wherein
   transmitting data based on the configured uplink channel and the configured downlink channel comprises transmitting data based on the uplink channel and the downlink channel of each of the plurality of carriers.

4. A base station, comprising:
   a processor configured to determine a quantity of system flows based on a random access channel (RACH) detection result, and to configure an uplink channel and a downlink channel based on the quantity of system flows, wherein the uplink channel is a radio frequency channel used for uplink transmission, and the downlink channel is a radio frequency channel used for downlink transmission, wherein the processor comprises a baseband processing module configured to:
- determine a quantity of uplink channels and a quantity of downlink channels based on the quantity of system flows;
- determine the uplink channel based on the quantity of uplink channels;
- determine the downlink channel based on the quantity of downlink channels;
- notify a radio frequency processing module of information about the uplink channel and the downlink channel; and
- the radio frequency processing module configured to determine the uplink channel and the downlink channel based on the information about the uplink channel and the downlink channel; and
- a transceiver configured to transmit data based on the configured uplink channel and the configured downlink channel.

5. The base station according to claim 4, wherein the processor further comprises:
- a remote processing module configured to determine the uplink channel and the downlink channel based on the quantity of system flows, and to notify the baseband processing module and the radio frequency processing module of information about the uplink channel and the downlink channel, wherein
- the radio frequency processing module is configured to determine the uplink channel and the downlink channel based on the information about the uplink channel and the downlink channel.

6. The base station according to claim 4, in a multicarrier communication scenario, wherein
the processor is configured to:
- determine a quantity of system flows of each of a plurality of carriers based on the RACH detection result of each of the plurality of carriers, and to
- configure an uplink channel and a downlink channel of each of the plurality of carriers based on the quantity of system flows of each of the plurality of carriers; and
- the transceiver is configured to transmit data based on the uplink channel and the downlink channel of each of the plurality of carriers.

7. A non-transitory computer-readable storage medium including instructions that, when executed by a processor in a base station, cause the base station to perform operations comprising:
- determining, by the base station, a quantity of system flows based on a random access channel (RACH) detection result, wherein the base station comprises a baseband part and a radio frequency part;
- configuring, by the base station, an uplink channel and a downlink channel based on the quantity of system flows comprising:
  - determining a quantity of uplink channels and a quantity of downlink channels based on the quantity of system flows;
  - determining the uplink channel based on the quantity of uplink channels;
  - determining the downlink channel based on the quantity of downlink channels;
  - notifying, by the baseband part, the radio frequency part of information about the uplink channel and the downlink channel; and
  - determining, by the radio frequency part, the uplink channel and the downlink channel based on the information about the uplink channel and the downlink channel, wherein the uplink channel is a radio frequency channel used for uplink transmission, and the downlink channel is a radio frequency channel used for downlink transmission; and
- transmitting data based on the configured uplink channel and the configured downlink channel.

8. The computer-readable storage medium according to claim 7, wherein the base station further comprises a remote entity; and wherein
configuring the uplink channel and the downlink channel based on the quantity of system flows comprises:
- determining, by the remote entity, the uplink channel and the downlink channel based on the quantity of system flows;
- notifying, by the remote entity, the baseband part and the radio frequency part of information about the uplink channel and the downlink channel; and
- determining, by the radio frequency part, the uplink channel and the downlink channel based on the information about the uplink channel and the downlink channel.

9. The computer-readable storage medium of claim 7, in a multicarrier communication scenario, wherein determining a quantity of system flows based on a RACH detection result comprises determining a quantity of system flows of each of a plurality of carriers based on a RACH detection result of each of the plurality of carriers; wherein
configuring the uplink channel and the downlink channel based on the quantity of system flows comprises configuring, by the base station, an uplink channel and a downlink channel of each of the plurality of carriers based on the quantity of system flows of each of the plurality of carriers; and wherein
transmitting data based on the configured uplink channel and the configured downlink channel comprises transmitting data based on the uplink channel and the downlink channel of each of the plurality of carriers.

* * * * *